(12) United States Patent
Sun et al.

(10) Patent No.: US 10,440,734 B2
(45) Date of Patent: Oct. 8, 2019

(54) SCHEDULING CONFIGURATION METHOD AND DEVICE, AND STORAGE MEDIUM

(71) Applicant: ZTE Corporation, Shenzhen (CN)

(72) Inventors: Yunfeng Sun, Shenzhen (CN); Yu Ngok Li, Shenzhen (CN); Jun Xu, Shenzhen (CN); Junfeng Zhang, Shenzhen (CN); Senbao Guo, Shenzhen (CN)

(73) Assignee: ZTE CORPORATION (CN)

( * ) Notice: Subject to any disclaimer, the term of this patent is extended or adjusted under 35 U.S.C. 154(b) by 76 days.

(21) Appl. No.: 15/025,180

(22) PCT Filed: May 12, 2014

(86) PCT No.: PCT/CN2014/077321
§ 371 (c)(1),
(2) Date: Mar. 25, 2016

(87) PCT Pub. No.: WO2015/043196
PCT Pub. Date: Apr. 2, 2015

(65) Prior Publication Data
US 2016/0270113 A1   Sep. 15, 2016

(30) Foreign Application Priority Data

Sep. 25, 2013 (CN) .......................... 2013 1 0443156

(51) Int. Cl.
*H04W 72/12* (2009.01)
*H04B 7/06* (2006.01)
(Continued)

(52) U.S. Cl.
CPC ........ *H04W 72/1278* (2013.01); *H04B 7/024* (2013.01); *H04B 7/0617* (2013.01);
(Continued)

(58) Field of Classification Search
None
See application file for complete search history.

(56) References Cited

U.S. PATENT DOCUMENTS 7,433,365 B1  10/2008  Burch
8,156,500 B2   4/2012  Helander
(Continued)

FOREIGN PATENT DOCUMENTS

CN   1555160 A   12/2004
CN   1926891 A    3/2007
(Continued)

OTHER PUBLICATIONS

International Search Report in international application No. PCT/CN2014/077321, dated Jul. 30, 2014.
(Continued)

*Primary Examiner* — Candal Elpenord
(74) *Attorney, Agent, or Firm* — McDonald Hopkins LLC (57) ABSTRACT

The present disclosure discloses a scheduling configuration method, which includes that: a centralized control unit configures coordination parameters of different nodes, and distributed scheduling units in each node schedule user resources of the local nodes. The present disclosure also discloses a scheduling configuration device, which includes: a configuration unit and scheduling units, wherein the configuration unit is arranged in a centralized control unit and configured to configure coordination parameters of different nodes; and the scheduling units are arranged in each node and configured to schedule user resources of the local nodes. By the technical solutions of the present disclosure, the problem of time delay, caused by backhaul, of a non-coordination user in a centralized scheduling manner is solved; and coordination configuration is performed on parameters which are relatively semi-static or change more (Continued)

slowly to eliminate influence on user scheduling flexibility under the condition of implementing system transmission.

21 Claims, 3 Drawing Sheets

(51) Int. Cl.
*H04W 28/16* (2009.01)
*H04B 7/024* (2017.01)
*H04L 5/00* (2006.01)
*H04L 5/14* (2006.01)
*H04W 84/04* (2009.01)

(52) U.S. Cl.
CPC ........... *H04L 5/0051* (2013.01); *H04W 28/16* (2013.01); *H04W 72/121* (2013.01); *H04B 7/0626* (2013.01); *H04L 5/0044* (2013.01); *H04L 5/14* (2013.01); *H04W 84/042* (2013.01)

(56) References Cited

U.S. PATENT DOCUMENTS

| | | | |
|---|---|---|---|
| 2008/0107014 A1 | 5/2008 | Huang | |
| 2012/0281554 A1* | 11/2012 | Gao | H04W 48/12 370/252 |
| 2012/0281556 A1* | 11/2012 | Sayana | H04B 7/024 370/252 |
| 2013/0053077 A1* | 2/2013 | Barbieri | H04B 7/0626 455/509 |
| 2013/0089159 A1* | 4/2013 | Liu | H04B 7/024 375/267 |
| 2013/0301434 A1* | 11/2013 | Krishnamurthy | H04L 1/0026 370/252 |
| 2014/0126496 A1* | 5/2014 | Sayana | H04B 7/024 370/329 |
| 2014/0192734 A1* | 7/2014 | Ng | H04L 5/0035 370/329 |
| 2014/0213269 A1* | 7/2014 | Nama | H04W 28/16 455/451 |
| 2014/0233466 A1* | 8/2014 | Pourahmadi | H04L 5/0051 370/329 |
| 2014/0348096 A1* | 11/2014 | Nagata | H04W 72/1247 370/329 |

FOREIGN PATENT DOCUMENTS

| | | |
|---|---|---|
| CN | 201639783 U | 11/2010 |
| CN | 102388542 A | 3/2012 |
| CN | 102546207 A | 7/2012 |
| CN | 102821473 A | 12/2012 |
| CN | 102857279 A | 1/2013 |
| CN | 103095441 A | 5/2013 |
| CN | 103199973 A | 7/2013 |
| EP | 2178328 A2 | 4/2010 |

OTHER PUBLICATIONS

English Translation of the Written Opinion of the International Search Authority in international application No. PCT/CN2014/077321, dated Jul. 30, 2014.

3GPP TS 36.211 V11.3.0 (Jun. 2013) Technical Specification Group Radio Access Network; Evolved Universal Terrestrial Radio Access (E-UTRA);Physical Channels and Modulation.

3GPP TS 36.213 V11.3.0 (Jun. 2013) Technical Specification Group Radio Access Network; Evolved Universal Terrestrial Radio Access (E-UTRA); Physical layer procedures.

* cited by examiner

SCHEDULING CONFIGURATION METHOD AND DEVICE, AND STORAGE MEDIUM

TECHNICAL FIELD

The present disclosure relates to a scheduling technology, and more particularly, to a scheduling configuration method and device, and a storage medium.

BACKGROUND

In Long Term Evolution Release 11 (LTE R11), a concept of Channel State Information (CSI) process is introduced to provide a support to Coordinated Multipoint Transmission and Reception (COMP): each CSI process corresponds to a Channel State Information Reference Signal (CSI-RS) resource and a Channel State Information-Interference Measurement Resource (CSI-IMR), wherein a Transmission Mode (TM) supporting COMP is TM10.

Wherein, a CSI-RS resource is defined in TS 36.211-b30, and when a system supports at most 8 antenna ports, a CSI-RS is transmitted on antenna ports p=15, p=15, 16, p=15, . . . , 18 and p=15, . . . , 22. According to different numbers of CSI-RS ports, when there may be 1, 2, 4 and 8 antenna ports, CSI-RS configuration manners (or called multiplexing factors) which may be supported by each subframe are respectively: under a normal Cyclic Prefix (CP), 32 (20 for Frequency Division Duplexing (FDD) and 12 for Time Division Duplexing (TDD)), 16 (10 for FDD and 6 for TDD) and 8 (5 for FDD and 3 for TDD); and under an extended CP, 28 (16 for FDD and 12 for TDD), 14 (8 for FDD and 6 for TDD) and 7 (4 for FDD and 3 for TDD). Moreover, a CSI-RS sending period may be 5/10/20/40/80 subframes; and the sending period and a CSI-RS sending subframe offset are configured in a unified manner. When TM9 is configured for User Equipment (UE), one set of CSI-RS may be configured for the UE; and when TM10 is configured for the UE, one or more sets of CSI-RSs (at most 3 sets) may be configured for the UE.

A CSI-IMR is defined in TS 36.213-b30, and when TM10 is configured for UE, one or more sets (at most 3 sets) of CSI-IMRs may be configured for the UE. Wherein, a CSI-IMR is determined by two parameters, i.e., a Zero Power (ZP) CSI-RS configuration and a ZP CSI-RS subframe configuration. Wherein, a ZP CSI-RS represents a CSI-RS which may be configured to be sent under zero power.

In Non Ideal Backhaul (NIB), an IMR is required to be configured with reference to a ZP CSI-RS of a coordination cell. For example, when a coordination cell corresponding to a CSI process does not perform muting, an IMR may not be configured to a resource corresponding to a ZP CSI-RS of the coordination cell, and when the coordination cell corresponding to the CSI process performs muting, the IMR is required to be configured to the resource corresponding to the ZP CSI-RS of the coordination cell. However, ZP CSI-RS configuration of the coordination cell has a requirement on determining a final ZP CSI-RS resource with reference to configuration of the IMR, which may cause the problem of mutual reference during configuration, thereby generating a conflict.

Similarly, during configuration of Coordinated Scheduling/Coordinated Beamforming (CSCB), nodes are required to interact with one another about weight using information of coordination beams on different resources, and since a current node may be a serving cell or a coordination cell for different users of any node, there also exists the problem of mutual reference in a beam coordination process.

In an existing scheduling architecture, two manners, i.e., distributed scheduling and centralized scheduling, are mainly adopted. Under a centralized scheduling condition, each node reports information such as CSI of a local user to a central scheduler, and the central scheduler configures a scheduling result to different nodes after scheduling; however, in such a manner, a scheduling time delay of a non-COMP user may be greatly prolonged in case of existence of a time delay for interaction among the nodes, thereby causing influence on performance of the non-COMP user. Under a distributed scheduling condition, although independent scheduling among the nodes may avoid the scheduling time delay, a requirement on interaction about information such as CSI and resource mapping manners among interfaces and the problem of mutual reference of ZP CSI-RS coordination configuration and BeamForming (BF) weight and resource coordination may cause complexity in interaction among the nodes and difficulty in coordination.

SUMMARY

In order to solve the technical problem, embodiments of the present disclosure provide a scheduling configuration method and device, and a storage medium, which may implement scheduling assistance, facilitate interaction and implement more flexible scheduling configuration.

The technical solutions of the embodiment of the present disclosure are implemented as follows.

A scheduling configuration method is provided, which includes that:

a centralized control unit configures coordination parameters of different nodes, and distributed scheduling units in each node schedule user resources of the local nodes.

Preferably, the step that the centralized control unit configures the coordination parameters of different nodes may include that:

the centralized control unit performs at least one of the following configuration on the coordination parameters of different nodes: CSI-RS configuration, ZP CSI-RS IMR configuration, semi-static coordination beam pattern configuration, semi-static muting resource pattern configuration, resource allocation priority configuration and Demodulation Reference Signal (DMRS) port and initialization parameter semi-static configuration.

Preferably, the method may further include that:

the centralized control unit statically or semi-statically configures the coordination parameters, or, generates the coordination parameters on the basis of CSI and/or CSI-RSs and/or resource mapping configuration parameter related information periodically or non-periodically reported by each node, and semi-statically sends the coordination parameters to each node; or, the centralized control unit actively requests each node to report the CSI and/or the CSI-RSs and/or the resource mapping configuration parameter related information, generates the coordination parameters according to reported parameters, and semi-statically sends the coordination parameters to each node.

Preferably, the step that the centralized control unit configures the coordination parameters of different nodes may include that: the centralized control unit sends a CSI-RS configuration request message to each node, and receives CSI-RS configuration information sent by each node; the centralized control unit determines ZP CSI-RS configuration information, IMR configuration information and/or CSI-RS configuration regulation information of each node according to the CSI-RS configuration information of each node, and sends the determined ZP CSI-RS configuration information, IMR configuration information and/or CSI-RS configuration regulation information of each node to each node; or the centralized control unit determines the ZP CSI-RS configuration information, IMR configuration information and/or CSI-RS configuration regulation information of each node, and sends the determined ZP CSI-RS configuration information, IMR configuration information and/or CSI-RS configuration regulation information of each node to each node; or the centralized control unit, after receiving CSI-RS, ZP CSI-RS and IMR configuration request messages sent by the nodes, determines the ZP CSI-RS configuration information, IMR configuration information and/or CSI-RS configuration regulation information of the nodes, and sends the determined ZP CSI-RS configuration information, IMR configuration information and/or CSI-RS configuration regulation information of the nodes to the nodes; or the centralized control unit, after receiving CSI-RS, ZP CSI-RS and IMR configuration request messages sent by one or some nodes, determines ZP CSI-RS configuration information, IMR configuration information and/or CSI-RS configuration regulation information of part or all of nodes to which the centralized control unit belongs, and sends the reconfigured ZP CSI-RS configuration information, IMR configuration information and/or CSI-RS configuration regulation information to the corresponding part or all of the nodes.

Preferably, the step that the CSI-RS configuration regulation information is determined may include that:

when it is determined that there exist conflicts of the CSI-RSs of the nodes, the CSI-RS configuration information is regulated to generate the CSI-RS configuration regulation information; or, according to COMP requirements of each node, the CSI-RS configuration information of the other nodes is configured to the current node, and the CSI-RS configuration information of the other nodes is determined as the CSI-RS configuration regulation information.

Preferably, the CSI-RS configuration information may include CSI-RS port number information, CSI-RS resource configuration information, CSI-RS subframe configuration information and scrambling Identifier (ID) configuration information; and the ZP CSI-RS configuration information may include ZP CSI-RS resource configuration information and ZP CSI-RS subframe configuration information.

Preferably, the method may further include that:

the centralized control unit configures coordination of BF modes and/or muting modes of each node, and sends BF mode and/or muting mode configuration information of each node to each node for each node to perform scheduling on the basis of the configured BF mode and/or muting mode configuration information; or the centralized control unit, after receiving coordination request messages of triggering the BF modes and/or the muting modes from the nodes and when determining that it is necessary to respond to the coordination request messages, configures coordination of the BF modes and/or muting modes of the nodes, and sends the BF mode and/or muting mode configuration information of the nodes to each node for the nodes to perform scheduling on the basis of the configured BF mode and/or muting mode configuration information; or the centralized control unit selectively sends a CSI request message to one or more nodes, receives the CSI sent by the nodes, configures coordination of the BF modes and/or muting modes of each node according to the CSI of each node, and sends the BF mode and/or muting mode configuration information of each node to each node for each node to perform scheduling on the basis of the configured BF mode and/or muting mode configuration information; or the centralized control unit, when receiving the coordination request messages of triggering the BF modes and/or the muting modes from the nodes and determining that it is necessary to respond, selectively sends the CSI request message to one or more nodes, configures coordination of the BF modes and/or muting modes of each node according to the CSI of each node after receiving the CSI on each resource set from the nodes, and sends the BF mode and/or muting mode configuration information of each node to each node for each node to perform scheduling on the basis of the configured BF modes and/or muting modes.

Preferably, the method may further include that:

the centralized control unit performs coordination configuration on DMRS port and/or initialization parameters of each node, and sends DMRS port and/or initialization parameter configuration information of each node to each node for each node to perform configuration on the basis of the configured DMRS port and/or initialization parameter configuration information; or the centralized control unit, when receiving coordination request messages of DMRS port and/or initialization parameter coordination configuration triggered by the nodes and determining that it is necessary to respond to the coordination request messages, performs coordination configuration on the DMRS port and/or initialization parameters of the nodes, and sends the DMRS port and/or initialization parameter configuration information of the nodes to each node for the nodes to perform configuration on the basis of the configured DMRS port and/or initialization parameter configuration information.

Preferably, the DMRS initialization parameters may include at least one of: scrambling IDs, cell IDs and DMRS port numbers; and correspondingly, the step that coordination configuration is performed on the DMRS ports and/or initialization parameters of the nodes may include that: coordination configuration is performed on DMRS port using and initialization parameters of the nodes on an Almost Blank Subframe (ABS).

Preferably, the nodes may include: Node Bs, or Radio Remote Heads (RRHs), or Picos, or small cells or Femtos; and correspondingly, the centralized control unit may perform information interaction with the nodes through an X2 interface or an Xn interface, wherein n may be a positive integer greater than or equal to 2.

Preferably, the method may further include that:

the centralized control unit, when receiving requests of acquiring the configuration information of the other nodes from the nodes, provides the configuration information of the other nodes for the nodes; or the nodes perform interaction about the configuration information, wherein the configuration information may include at least one of the following information: the CSI-RS configuration information, the ZP CSI-RS configuration information, the IMR configuration information, semi-static coordination beam pattern configuration information, muting resource pattern configuration information, resource allocation priority configuration information and DMRS port and initialization parameter semi-static configuration information.

A scheduling configuration device is provided, which includes: a configuration unit and scheduling units, wherein the configuration unit may be arranged in a centralized control unit and configured to configure coordination parameters of different nodes; and the scheduling unit may be arranged in each node and configured to schedule user resources of the local nodes.

Preferably, the configuration unit may further be configured to perform at least one of the following configuration on the coordination parameters of different nodes: CSI-RS configuration, ZP CSI-RS IMR configuration, semi-static coordination beam pattern configuration, semi-static muting resource pattern configuration, resource allocation priority configuration and DMRS port and initialization parameter semi-static configuration.

Preferably, the configuration unit may further be configured to:

statically or semi-statically configure the coordination parameters, or, generate the coordination parameters on the basis of CSI and/or CSI-RSs and/or resource mapping configuration parameter related information periodically or non-periodically reported by each node, and semi-statically send the coordination parameters to each node; or, by the centralized control unit, actively request each node to report the CSI and/or the CSI-RSs and/or the resource mapping configuration parameter related information, generate the coordination parameters according to reported parameters, and semi-statically send the coordination parameters to each node.

Preferably, the configuration unit may further be configured to send a CSI-RS configuration request message to each node, and receive CSI-RS configuration information sent by each node;

determine ZP CSI-RS configuration information, IMR configuration information and/or CSI-RS configuration regulation information of each node according to the CSI-RS configuration information of each node, and send the determined ZP CSI-RS configuration information, IMR configuration information and/or CSI-RS configuration regulation information of each node to each node; or determine the ZP CSI-RS configuration information, IMR configuration information and/or CSI-RS configuration regulation information of each node, and send the determined ZP CSI-RS configuration information, IMR configuration information and/or CSI-RS configuration regulation information of each node to each node; or after receiving CSI-RS, ZP CSI-RS and IMR configuration request messages sent by the nodes, determine the ZP CSI-RS configuration information, IMR configuration information and/or CSI-RS configuration regulation information of the nodes, and send the determined ZP CSI-RS configuration information, IMR configuration information and/or CSI-RS configuration regulation information of the nodes to the nodes; or after receiving CSI-RS, ZP CSI-RS and IMR configuration request messages sent by one or some nodes, determine ZP CSI-RS configuration information, IMR configuration information and/or CSI-RS configuration regulation information of part or all of nodes to which the centralized control unit belongs, and send the reconfigured ZP CSI-RS configuration information, IMR configuration information and/or CSI-RS configuration regulation information to the corresponding part or all of the nodes.

Preferably, the configuration unit may further be configured to, when it is determined that there exist conflicts of the CSI-RSs of the nodes, regulate the CSI-RS configuration information to generate the CSI-RS configuration regulation information; or, according to COMP requirements of each node, configure the CSI-RS configuration information of the other nodes to the current node, and determine the CSI-RS configuration information of the other nodes as the CSI-RS configuration regulation information.

Preferably, the configuration unit may further be configured to:

configure coordination of BF modes and/or muting modes of each node, and send BF mode and/or muting mode configuration information of each node to each node for each node to perform scheduling on the basis of the configured BF mode and/or muting mode configuration information; or after receiving coordination request messages of triggering the BF modes and/or the muting modes from the nodes and when determining that it is necessary to respond to the coordination request messages, configure coordination of the BF modes and/or muting modes of the nodes, and send the BF mode and/or muting mode configuration information of the nodes to each node for the nodes to perform scheduling on the basis of the configured BF mode and/or muting mode configuration information; or selectively send a CSI request message to one or more nodes, receive the CSI sent by the nodes, configure coordination of the BF modes and/or muting modes of each node according to the CSI of each node, and send the BF mode and/or muting mode configuration information of each node to each node for each node to perform scheduling on the basis of the configured BF mode and/or muting mode configuration information; or when receiving the coordination request messages of triggering the BF modes and/or the muting modes from the nodes and determining that it is necessary to respond, selectively send the CSI request message to one or more nodes, configure coordination of the BF modes and/or muting modes of each node according to the CSI of each node after receiving the CSI on each resource set from the nodes, and send the BF mode and/or muting mode configuration information of each node to each node for each node to perform scheduling on the basis of the configured BF modes and/or muting modes.

Preferably, the configuration unit may further be configured to:

perform coordination configuration on DMRS port and/or initialization parameters of each node, and send DMRS port and/or initialization parameter configuration information of each node to each node for each node to perform configuration on the basis of the configured DMRS port and/or initialization parameter configuration information; or when receiving coordination request messages of DMRS port and/or initialization parameter coordination configuration triggered by the nodes and determining that it is necessary to respond to the coordination request messages, perform coordination configuration on the DMRS port and/or initialization parameters of the nodes, and send the DMRS port and/or initialization parameter configuration information of the nodes to the nodes for the nodes to perform configuration on the basis of the configured DMRS port and/or initialization parameter configuration information.

Preferably, the nodes may include: Node Bs, or RRHs, or Picos, or small cells or Femtos; and correspondingly, the centralized control unit may perform information interaction with the nodes through an X2 interface or an Xn interface, wherein n may be a positive integer greater than or equal to 2.

A storage medium is provided, in which a computer program may be stored, the computer program being configured to execute the abovementioned scheduling configuration method.

According to the technical solutions of the embodiment of the present disclosure, the centralized control unit configures the coordination parameters of different nodes, and the distributed scheduling units in each node schedule the user resources of the local nodes. By the embodiment of the present disclosure, the problem of time delay caused by multiple interaction triggered by configuration conflicts caused by inter-node coordination in a distributed scheduling manner is solved, and the problem of time delay, caused by backhaul, of a non-coordination user in a centralized scheduling manner is solved; and coordination configuration is performed on parameters which are relatively semi-static or change more slowly to eliminate influence on user scheduling flexibility under the condition of implementing system transmission.

DETAILED DESCRIPTION

In order to make the purpose, technical solutions and advantages of the present disclosure clearer, embodiments of the present disclosure will be described below with reference to the drawings in detail. It is important to note that embodiments in the present disclosure and characteristics in the embodiment can be freely combined under the condition of no conflicts.

The present disclosure discloses a centralized control and distributed scheduling combination parameter configuration and user scheduling method for a wireless communication system, and its basic thought refers to that: a centralized control unit finishes coordination configuration of parameters of nodes and then sends the coordinated parameters to each node for each node to perform user resource scheduling according to the received parameters and performs CSI process, CSI-RS measurement set, ZP CSI-RS set and CSI-IMR set configuration according to the received parameters, or determines own BF weight using manners according to the received parameters or determine own resource muting manners.

Figure 1:
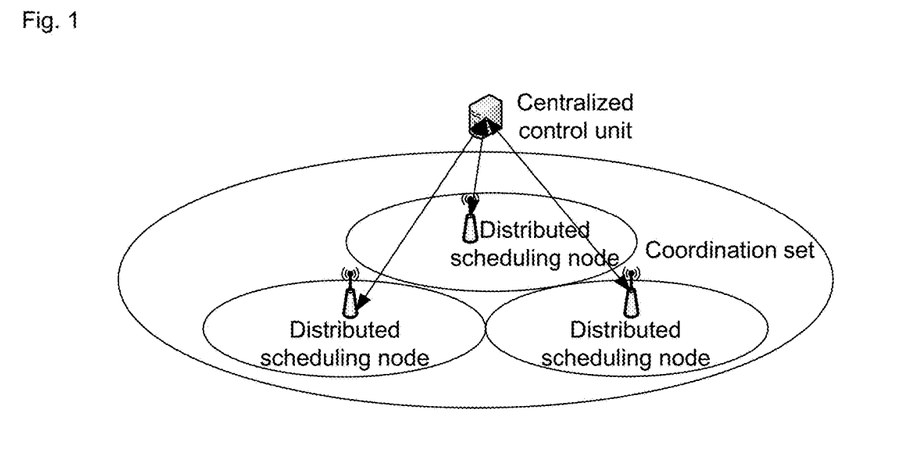
FIG. 1 is an architecture diagram of a scheduling configuration system combining centralized control and distributed scheduling.

FIG. 1 is an architecture diagram of a scheduling configuration system combining centralized control and distributed scheduling. As shown in FIG. 1, multiple distributed scheduling nodes are connected to a centralized control unit, and the multiple distributed scheduling nodes form a coordination set. In general, the centralized control unit is located in, for example, a host Node B, and the distributed scheduling nodes may be relay stations and the like. Or, the centralized control unit is located in a macro Node B, and the distributed scheduling nodes may be Picos, Femtos, small cells or the like. The distributed scheduling nodes are located in a coverage area of a Node B to which the centralized control unit belongs.

In the embodiment of the present disclosure, parameters, coordinated by the centralized control unit, of each node include, but not limited to, one or more of: CSI-RS configuration information, ZP CSI-RS configuration information, IMR configuration information, a semi-static coordination beam pattern configuration, a semi-static muting resource pattern configuration, a resource allocation priority configuration and semi-statically configured DMRS port and initialization parameters.

Wherein, the parameters may be statically or semi-statically configured by the centralized control unit directly, and may also be generated on the basis of CSI and/or CSI-RSs and/or resource mapping configuration parameter related information periodically or non-periodically reported by each node and configured semi-statically. Or the centralized control unit actively requests each node to report the CSI and/or the CSI-RSs and/or the resource mapping configuration parameter related information, generates the parameters according to reported parameters, and semi-statically sends the parameters to each node.

Wherein, when a network side configures the coordination parameters of each node, the centralized control unit may configure the parameters corresponding to each node to the node only, may also simultaneously configure the parameters corresponding to part or all of the other nodes to the node, or configures configuration information of the other nodes in the coordination set to the node according to requirements of each node.

Wherein, the coordination set refers to a cluster of nodes capable of performing COMP.

Wherein, when the network side configures the coordination parameters of each node, current CSI-RSs of each node may be regulated to avoid conflicts of the CSI-RSs of the nodes.

Wherein, the CSI-RS configuration information may include one or more of: CSI-RS port number information, CSI-RS resource configuration information, CSI-RS subframe configuration information and scrambling ID configuration information; and the ZP CSI-RS and IMR configuration information includes ZP CSI-RS resource configuration information and ZP CSI-RS subframe configuration information.

Wherein, parameter coordination configuration of the centralized control unit among the nodes may be actively initiated by the centralized control unit, and the coordinated parameters are configured to each node; and the coordination parameters may also be regulated according to (a) request(s) of one or more nodes.

Wherein, beam pattern coordination configuration refers to coordination configuration of BF weights adopted for BF of each node on different resources, wherein different resources may be different sub-bands or Physical Resource Blocks (PRBs) on the frequency domain, may also be different subframes on the time domain, and may further be changes, made on different subframes according to serial numbers of the subframes, of beam weights on different sub-bands or PRBs on the frequency domain.

Wherein, muting resource patterns may be muting manners of different sub-bands or PRBs on the frequency domain, may also be muting manners of different subframes on the time domain, and may further be changes, made on different subframes according to serial numbers of the subframes, of muting manners of different sub-bands or PRBs on the frequency domain.

Wherein, the DMRS initialization parameters include: scrambling IDs, cell IDs and DMRS port numbers.

Wherein coordination configuration of the centralized control unit over the DMRS port and/or initialization parameters of each node may only be configured to indicate coordination configuration over DMRS port using and initialization parameters of each node on an ABS subframe.

On such a basis, the nodes may further send requests to the centralized control unit to acquire the configuration information, including, but not limited to, the following information, of the other nodes: the CSI-RS configuration information, the ZP CSI-RS configuration information, the IMR configuration information, the semi-static coordination beam pattern configuration, the semi-static muting resource pattern configuration, the resource allocation priority configuration and semi-statically configured DMRS port and initialization parameters; or the nodes may further send requests to the other nodes for interaction about the configuration information, wherein the configuration information includes, but not limited to, the following information: the CSI-RS configuration information, the ZP CSI-RS configuration information, the IMR configuration information, the semi-static coordination beam pattern configuration, the semi-static muting resource pattern configuration, the resource allocation priority configuration and semi-statically configured DMRS port and initialization parameters.

Wherein, when information interaction is requested, if request messages include the CSI-RS configuration information, the ZP CSI-RS configuration information and the IMR configuration information, only interaction about subframe offset information or one or more sets of resource location information of the CSI-RS configuration information, the ZP CSI-RS configuration information and the IMR configuration information may be performed.

Wherein the nodes include, but not limited to: Node Bs, RRHs, Picos, small cells and Femtos.

In order to facilitate the thought of the present disclosure, specific implementation modes of the present disclosure will be described below with specific embodiments, and in the following embodiments, the thought of the present disclosure is described with reference to independent resource scheduling of each node on the basis of coordination configuration of the centralized control unit over part of the parameters; and during a practical application, the centralized control unit may perform coordination configuration on all the parameters.

In the following embodiments, the centralized control unit controls parameter configuration of N nodes, wherein N is a positive integer greater than or equal to 1.

Embodiment 1

Figure 2:
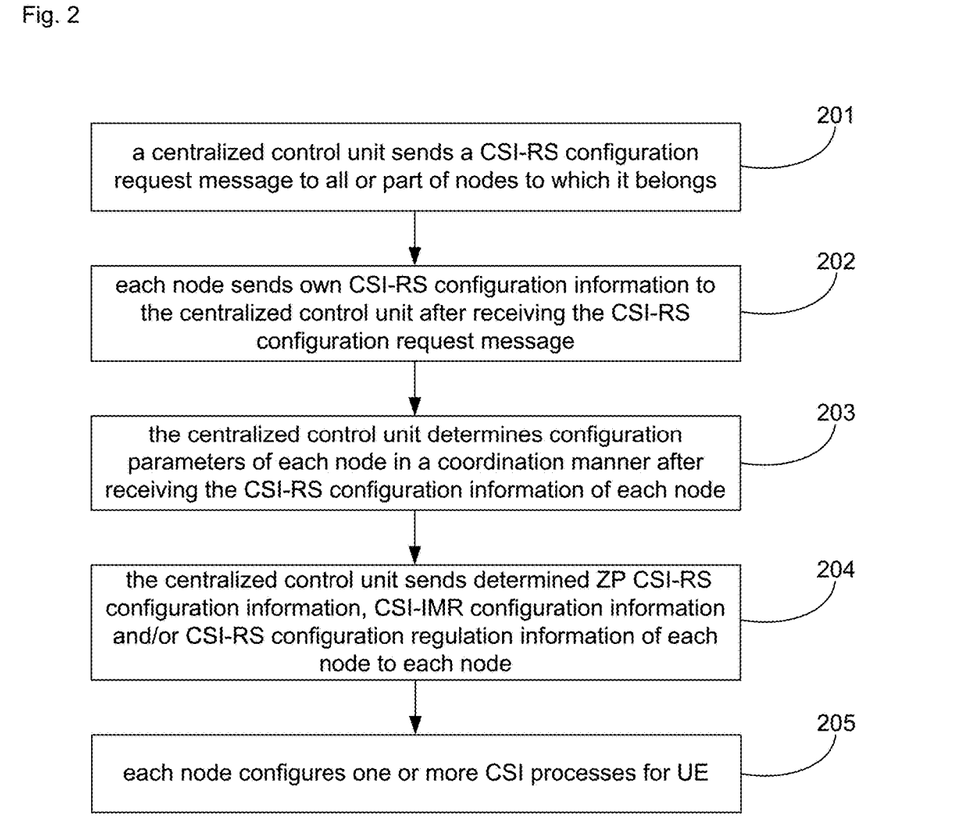
FIG. 2 is a flowchart of a scheduling configuration method according to embodiment 1 of the present disclosure.

In the embodiment, a centralized control unit performs coordination configuration on CSI-RSs, ZP CSI-RSs and CSI-IMRs of all or part of nodes to which it belongs. FIG. 2 is a flowchart of a scheduling configuration method according to embodiment 1 of the present disclosure, as shown in FIG. 2, the scheduling configuration method of the present disclosure includes the following steps:

Step 201: a centralized control unit sends a CSI-RS configuration request message to all or part of the nodes to which it belongs;

Step 202: each node sends own CSI-RS configuration information to the centralized control unit after receiving the CSI-RS configuration request message;

Step 203: the centralized control unit determines configuration parameters of each node in a coordination manner after receiving the CSI-RS configuration information of each node, wherein after receiving the CSI-RS configuration information of each node, the centralized control unit determines the following parameters of each node in the coordination manner:

ZP CSI-RS configuration information, IMR configuration information and/or CSI-RS configuration regulation information;

Step 204: the centralized control unit sends determined ZP CSI-RS configuration information, CSI-IMR configuration information and/or CSI-RS configuration regulation information of each node to each node; and Step 205: each node configures one or more CSI processes for UE.

After obtaining own ZP CSI-RS configuration information, CSI-IMR configuration information and/or CSI-RS configuration regulation information, each node configures a ZP CSI-RS, CSI-IMR and CSI-RS set corresponding to the UE to the UE through UE-specific signalling according to requirements of different users and expected UE TMs and fed-back CSI of the nodes, and configures one or more CSI processes for the UE on the basis of these parameters.

When the centralized control unit performs ZP CSI-RS and CSI-IMR configuration according to the CSI-RSs of each node, the problem of time delay prolonging caused by frequent interaction under the condition of existence of time delays among the nodes may be solved. In addition, a conflict between CSI-IMR configuration and ZP CSI-RS configuration in a measurement set is avoided.

In a practical system, the CSI-RSs of each node are usually statically configured, or are fixed within a relatively long time, so that CSI-RS configurations of each node may be stored in the centralized control unit after the CSI-RS configurations of each node are obtained, and under such a condition, it is unnecessary to request to acquire the CSI-RS configuration information of each node within each centralized configuration period. Therefore, step 201 and/or step 202 may be omitted.

In addition, when coordination users under the nodes change and the nodes expect to regulate the ZP CSI-RSs, and/or the CSI-IMRs and/or the CSI-RSs in some scenarios, a requirement on re-coordination of the related parameters may be triggered by one or more nodes. Therefore, during a practical application, there may exist the following processing flow, including:

Step a: one or more nodes send coordination configuration requests to the centralized control unit; and Step b: the centralized control unit determines whether to accept the reconfiguration requests or not, refuses the requests if not accepting the requests, otherwise continues executing step 201 to step 205, wherein, as mentioned above, step 201 and/or step 202 may be omitted.

Wherein, when one or more nodes perform ZP CSI-RS, and/or CSI-IMR and/or CSI-RS coordination configuration, the centralized control unit may only reconfigure the related information of the requesting nodes, and may also coordinate and reconfigure part or all of multiple nodes to which it belongs.

Embodiment 2

In the embodiment, a specific coordination configuration process that a centralized control unit performs coordination configuration on BF weight patterns and/or resource muting patterns of each node is as follows.

Figure 3:
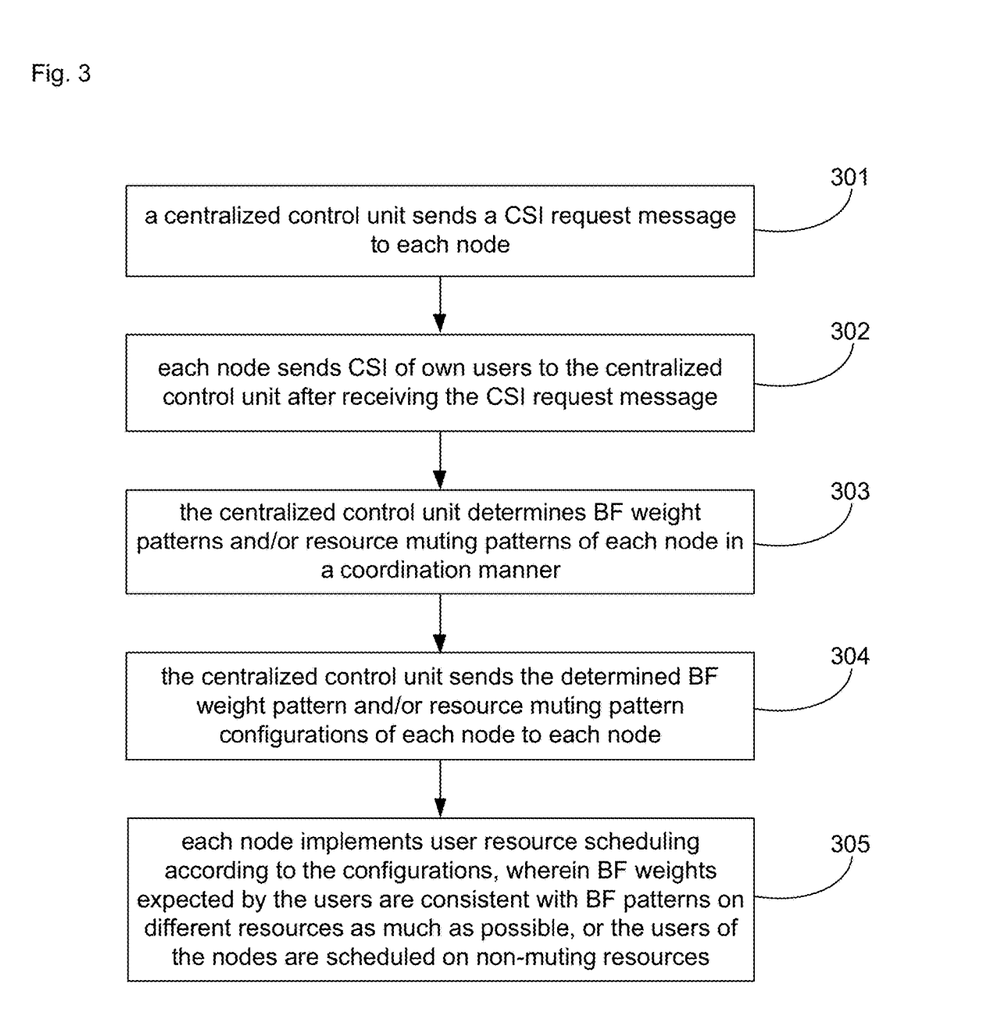
FIG. 3 is a flowchart of a scheduling configuration method according to embodiment 2 of the present disclosure.

FIG. 3 is a flowchart of a scheduling configuration method according to embodiment 2 of the present disclosure, as shown in FIG. 3, the specific coordination configuration process includes:

Step 301: a centralized control unit sends a CSI request message to each node;

Step 302: each node sends CSI of own users to the centralized control unit after receiving the CSI request message;

Step 303: the centralized control unit determines BF weight patterns and/or resource muting patterns of each node in a coordination manner;

Step 304: the centralized control unit sends the determined BF weight pattern and/or resource muting pattern configurations of each node to each node; and Step 305: each node implements user resource scheduling according to the configurations, wherein BF weights expected by the users are consistent with BF patterns on different resources as much as possible, or the users of the nodes are scheduled on non-muting resources.

After obtaining own BF weight patterns and/or resource muting patterns, each node determines BF weights on different resources and/or whether the resources are muting or not, and implements user resource scheduling according to the configurations. The BF weights expected by the users are consistent with the BF patterns on different resources as much as possible, or the users of the nodes are scheduled on the non-muting resources. Therefore, the aim of avoiding interference among the nodes is fulfilled. The problem of conflicts of the BF patterns and/or the muting patterns during direct interactive configuration among the nodes is solved.

In a practical system, the centralized control unit may also not request for the CSI of each node but directly semi-statically plan the BF patterns or muting patterns of each node according to a relationship of cells, and under such a condition, step 301 and/or step 302 may be omitted.

In addition, when distribution of coordination users under the nodes changes in some scenarios, the nodes expect to regulate the BF patterns and/or the muting patterns, and under such a condition, a requirement on re-coordination of the related parameters may be triggered by one or more nodes. Therefore, during a practical application, there may exist the following processing flow, including:

Step a: one or more nodes send coordination configuration requests to the centralized control unit; and Step b: the centralized control unit determines whether to accept the reconfiguration requests or not, refuses the requests if not accepting the requests, otherwise continues executing step 301 to step 305, wherein, as mentioned above, step 301 and/or step 302 may be omitted.

Wherein, when one or more nodes perform BF weight pattern and/or resource muting pattern coordination configuration, the centralized control unit may only reconfigure the related information of the requesting nodes, and may also coordinate and reconfigure part or all of multiple nodes to which it belongs.

Embodiment 3

Figure 4:
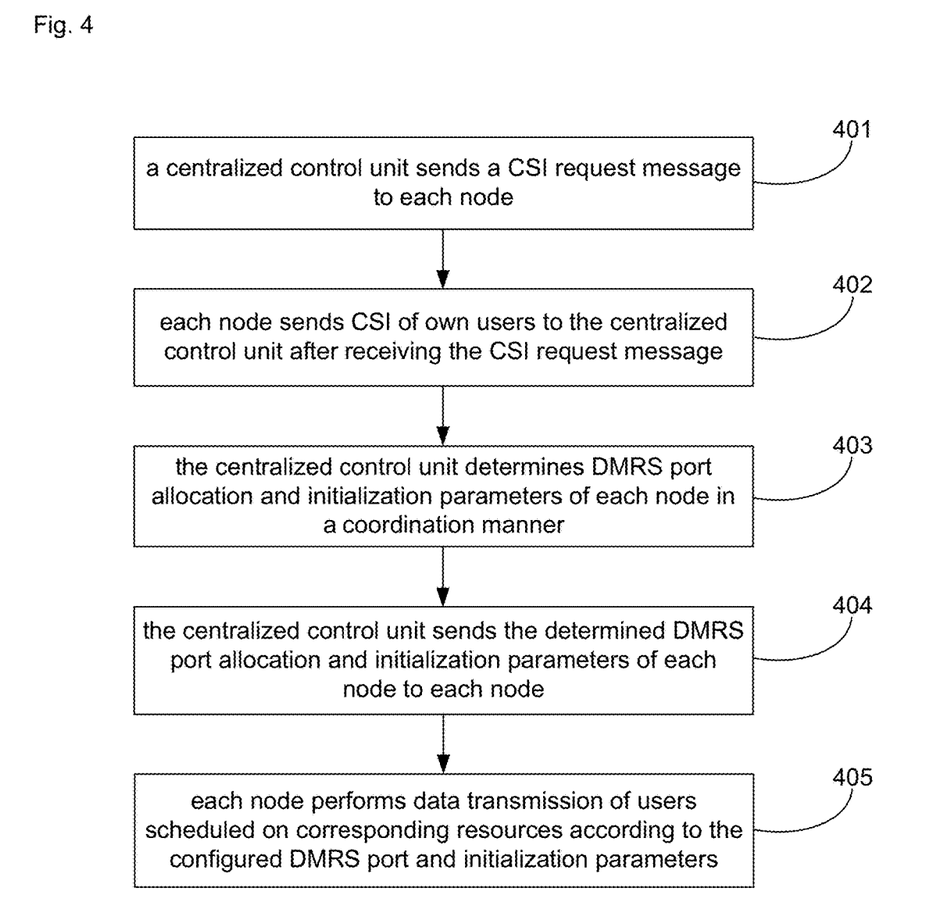
FIG. 4 is a flowchart of a scheduling configuration method according to embodiment 1 of the present disclosure.

In the embodiment, a centralized control unit performs coordination configuration on marginal DMRS port using conditions and DMRS initialization parameter configurations of each node, and a specific coordination configuration process includes:

Step 401: a centralized control unit sends a CSI request message to each node;

Step 402: each node sends CSI of own users to the centralized control unit after receiving the CSI request message;

Step 403: the centralized control unit determines DMRS port allocation and initialization parameters of each node in a coordination manner;

Step 404: the centralized control unit sends the determined DMRS port allocation and initialization parameters of each node to each node; and Step 405: each node performs data transmission of users scheduled on corresponding resources according to the configured DMRS port and initialization parameters.

After obtaining own DMRS port allocation and initialization parameters, each node determines the DMRS port allocation and initialization parameters on different resources, and performs data transmission of the users scheduled on the corresponding resources according to the configured DMRS port and initialization parameters during scheduling. Therefore, orthogonality of DMRS ports among the nodes is achieved, user interference estimation capability is improved and performance of a terminal receiver is further improved.

In a practical system, the centralized control unit may also not request for the CSI of each node but directly semi-statically plan the DMRS port allocation and initialization parameters of each node, and under such a condition, step 401 and/or step 402 may be omitted.

In addition, when distribution of coordination users under the nodes changes in some scenarios, the nodes expect to regulate the DMRS port allocation and initialization parameters, and under such a condition, a requirement on re-coordination of the related parameters may be triggered by one or more nodes. Therefore, during a practical application, there may exist the following processing flow, including:

Step a: one or more nodes send coordination configuration requests to the centralized control unit; and Step b: the centralized control unit determines whether to accept the reconfiguration requests or not, refuses the requests if not accepting the requests, otherwise continues executing step 401 to step 405, wherein, as mentioned above, step 401 and/or step 402 may be omitted.

Wherein, when one or more nodes perform DMRS port allocation and initialization parameter coordination configuration, the centralized control unit may only reconfigure the related information of the requesting nodes, and may also coordinate and reconfigure part or all of multiple nodes to which it belongs.

In such a manner, when the centralized control unit configures the DMRS port allocation and initialization parameters of each node, different initialization parameters may be configured on different resources according to a certain resource granularity. Therefore, orthogonality of the DMRS ports between different nodes and multiple coordination nodes around may be achieved.

Under a preferred condition, the nodes may determine that configuration of the DMRS port and initialization parameters may be effective only on an ABS as a default. Transmission according to the configured DMRS port and initialization parameters on the ABS may enable an interfered cell to accurately estimate a covariance matrix of an interference signal and effectively eliminate interference by virtue of a receiver algorithm.

Embodiment 4

Based on the method and embodiment 1/2/3 of the present disclosure, in another application scenario, nodes may expect to obtain information, including, but not limited to, the following information, of the other nodes: CSI-RS configuration information, ZP CSI-RS configuration information, IMR configuration information, semi-static coordination beam pattern configurations, semi-static muting resource pattern configurations, resource allocation priority configurations, semi-statically configured DMRS port and initialization parameters and the like, thereby learning about that which CSI-RS configuration information, ZP CSI-RS configuration information, IMR configuration information, semi-static coordination beam pattern configurations, semi-static muting resource pattern configurations, resource allocation priority configurations and semi-statically configured DMRS port and initialization parameters in a coordination area have been configured.

Under such a condition, the nodes may send requests to a centralized control unit or the other nodes through X2 or Xn (n is an integer greater than 2) interfaces. After the control unit or the other nodes receive the requests:

if the nodes may send the requests to the centralized control unit and the centralized control unit stores the requested configuration information of the nodes to which it belongs in the coordination area, the centralized control unit sends one or more sets of requested information to the requesting nodes; or if the nodes send the requests to the centralized control unit but the centralized control unit does not store the requested configuration information of the nodes to which it belongs in the coordination area, the centralized control unit sends configuration request messages to the nodes to which it belongs, the nodes to which the centralized control unit belongs report own configuration information to the centralized control unit after receiving the request messages of the centralized control unit, and then the centralized control unit sends the requested information requested by the requesting nodes to the requesting nodes; or if the nodes send the requests to the centralized control unit but the centralized control unit does not store the requested configuration information of the nodes to which it belongs in the coordination area, the centralized control unit refuses the requests of the requesting nodes, refusing requests containing information indicating nonexistence of the requested information, the requesting nodes directly send the requests to the other nodes in the coordination area through the X2 interfaces after requesting nodes obtain the information, and the other nodes send own configuration parameters to the requesting nodes according to information contents requested by the requesting nodes after receiving the requests.

The nodes may also directly request for information interaction through the X2 interfaces, and the other nodes send own configuration parameters to the requesting nodes according to the information contents requested by the requesting nodes after receiving the requests. Information requested to interact about includes, but not limited to: information such as the CSI-RS configuration information, the ZP CSI-RS configuration information, the IMR configuration information, the semi-static coordination beam pattern configurations, semi-static muting resource pattern configurations, the resource allocation priority configurations and the semi-statically-configured DMRS port and initialization parameters.

Wherein, when information interaction is requested, if request messages include the CSI-RS configuration information, the ZP CSI-RS configuration information and the IMR configuration information, only interaction about subframe offset information or one or more sets of resource location information of the CSI-RS configuration information, the ZP CSI-RS configuration information and the IMR configuration information may be performed.

Figure 5:
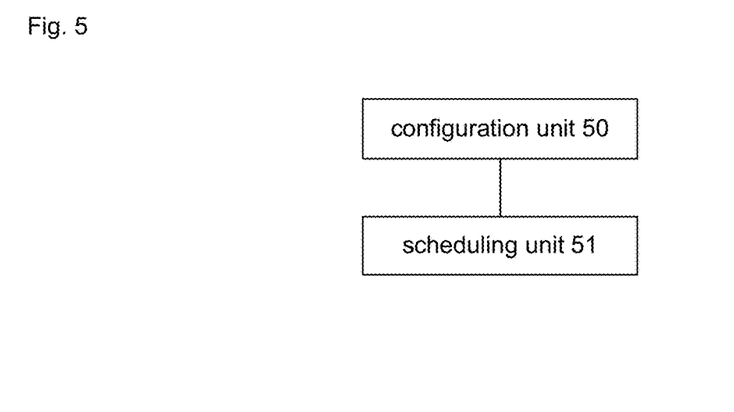
FIG. 5 is a structure diagram of a scheduling configuration device according to an embodiment of the present disclosure.

FIG. 5 is a structure diagram of a scheduling configuration device according to an embodiment of the present disclosure, as shown in FIG. 5, the scheduling configuration device of the embodiment of the present disclosure includes a configuration unit 50 and scheduling units 51, wherein the configuration unit 50 is arranged in a centralized control unit and configured to configure coordination parameters of different nodes; and the scheduling units 51 are arranged in each node and configured to schedule user resources of the local nodes.

As a preferred manner, the configuration unit 50 is further configured to perform at least one of the following configuration on the coordination parameters of different nodes: CSI-RS configuration, ZP CSI-RS IMR configuration, semi-static coordination beam pattern configuration, semi-static muting resource pattern configuration, resource allocation priority configuration and DMRS port and initialization parameter semi-static configuration.

As a preferred manner, the configuration unit 50 is further configured to send a CSI-RS configuration request message to each node, and receive CSI-RS configuration information of each node from each node;

determine ZP CSI-RS configuration information, IMR configuration information and/or CSI-RS configuration regulation information of each node according to the CSI-RS configuration information of each node, and send the determined ZP CSI-RS configuration information, IMR configuration information and/or CSI-RS configuration regulation information of each node to each node; or determine the ZP CSI-RS configuration information, IMR configuration information and/or CSI-RS configuration regulation information of each node, and send the determined ZP CSI-RS configuration information, IMR configuration information and/or CSI-RS configuration regulation information of each node to each node; or after receiving CSI-RS, ZP CSI-RS and IMR configuration request messages sent by the nodes, determine the ZP CSI-RS configuration information, IMR configuration information and/or CSI-RS configuration regulation information of the nodes, and send the determined ZP CSI-RS configuration information, IMR configuration information and/or CSI-RS configuration regulation information of the nodes to the nodes; or after receiving CSI-RS, ZP CSI-RS and IMR configuration request messages sent by one or some nodes, determine ZP CSI-RS configuration information, IMR configuration information and/or CSI-RS configuration regulation information of part or all of nodes to which the centralized control unit belongs, and send the reconfigured ZP CSI-RS configuration information, IMR configuration information and/or CSI-RS configuration regulation information to the corresponding part or all of the nodes.

As a preferred manner, the configuration unit 50 is further configured to, when it is determined that there exist conflicts of CSI-RSs of the nodes, regulate the CSI-RS configuration information to generate the CSI-RS configuration regulation information; or, according to requirements of each node on a COMP measurement set, configure the CSI-RS configuration information of the other nodes in the measurement set to the current node, and determine the CSI-RS configuration information of the other nodes as the CSI-RS configuration regulation information.

As a preferred manner, the configuration unit 50 is further configured to:

configure coordination of BF modes and/or muting modes of each node, and send BF mode and/or muting mode configuration information of each node to each node for each node to perform scheduling on the basis of the configured BF mode and/or muting mode configuration information; or after receiving coordination request messages of triggering the BF modes and/or the muting modes from the nodes and when determining that it is necessary to respond to the coordination request messages, configure coordination of the BF modes and/or muting modes of the nodes, and send the BF mode and/or muting mode configuration information of the nodes to each node for the nodes to perform scheduling on the basis of the configured BF mode and/or muting mode configuration information; or selectively send a CSI request message to one or more nodes, receive the CSI sent by the nodes, configure coordination of the BF modes and/or muting modes of each node according to the CSI of each node, and send the BF mode and/or muting mode configuration information of each node to each node for each node to perform scheduling on the basis of the configured BF mode and/or muting mode configuration information; or when receiving the coordination request messages of triggering the BF modes and/or the muting modes from the nodes and determining that it is necessary to respond, selectively send the CSI request message to one or more nodes, configure coordination of the BF modes and/or muting modes of each node according to the CSI of each node after receiving the CSI on each resource set from the nodes, and send the BF mode and/or muting mode configuration information of each node to each node for each node to perform scheduling on the basis of the configured BF modes and/or muting modes.

As a preferred manner, the configuration unit 50 is further configured to:

perform coordination configuration on DMRS port and/or initialization parameters of each node, and send DMRS port and/or initialization parameter configuration information of each node to each node for each node to perform configuration on the basis of the configured DMRS port and/or initialization parameter configuration information; or when receiving coordination request messages of DMRS port and/or initialization parameter coordination configuration triggered by the nodes and determining that it is necessary to respond to the coordination request messages, perform coordination configuration on the DMRS port and/or initialization parameters of the nodes, and send the DMRS port and/or initialization parameter configuration information of the nodes to the nodes for the nodes to perform configuration on the basis of the configured DMRS port and/or initialization parameter configuration information.

The nodes include: Node Bs, or RRHs, or Picos, or small cells or Femtos; and correspondingly, the centralized control unit performs information interaction with the nodes through an X2 interface or an Xn interface, wherein n may be a positive integer greater than or equal to 2.

Those skilled in the art should know that functions of each processing unit in the scheduling configuration device of the embodiment of the present disclosure may be understood with reference to related description in the abovementioned scheduling configuration method, and each processing unit in the scheduling configuration device of the embodiment of the present disclosure may be implemented by virtue of an analogue circuit which realizes the functions in the embodiment of the present disclosure, and may also be implemented by virtue of operation of software which realizes the functions in the embodiment of the present disclosure on intelligent equipment.

The embodiment of the present disclosure also records a storage medium, in which a computer program may be stored, the computer program being configured to execute the abovementioned scheduling configuration method.

From the embodiments provided by the present disclosure, it should be understood that the disclosed method and intelligent equipment may be implemented in other manners. The embodiments described above are only schematic. For example, division of units is only division of logic functions, and may adopt other division manners during practical implementation, for example: multiple units or components may be combined, or may be integrated to another system, or some features may be omitted, or may not be executed. In addition, coupling, or direct coupling, or communication connection among the displayed or discussed parts may be indirect coupling or communication connection implemented through some interfaces, equipment or units, and may be electric, mechanical or of other forms.

The units described as separate parts may be, or may not be physically separate, and the parts displayed as units may be, or may not be physical units, that is, they may be located at the same position, and may also be distributed on multiple network units; and part or all of the units may be selected to fulfil the aim of the solutions of the embodiment according to a practical requirement.

In addition, each functional unit in the embodiment of the present disclosure may be all integrated in the same processing unit, each unit may also serve as an independent unit, and two or greater than two units may also be integrated in the same unit; and the integrated units may be implemented in form of hardware, and may also be implemented in form of hardware and software functional unit.

Those skilled in the art should know that: all or part of steps implementing the method embodiment may be implemented by program instruction related hardware, the program may be stored in a computer-readable storage medium, and when the program is executed, the steps of the method embodiment are executed; and the storage medium includes: various media capable of storing program codes, such as mobile storage equipment, a Read-Only Memory (ROM), a Random Access Memory (RAM), a magnetic disk or an optical disk.

Or, the integrated units of the embodiment of the present disclosure, if being implemented in form of software function module and sold or used as independent products, may also be stored in a computer-readable storage medium. Based on such standing, the technical solutions of the embodiment of the present disclosure substantially or parts with contributions to a conventional art may be reflected in form of software product, and such a computer software product is stored in a storage medium, including a plurality of instructions configured to enable computer equipment (which may be a personal computer, a server, network equipment or the like) to execute all or part of the method in each embodiment of the present disclosure. The storage medium includes: various media capable of storing program codes, such as mobile storage equipment, a ROM, a RAM, a magnetic disk or an optical disk.

The above is only the specific implementation mode of the present disclosure and not intended to limit the scope of protection of the present disclosure, and any variations or replacements apparent to those skilled in the art within the technical scope disclosed in the present disclosure shall fall within the scope of protection of the present disclosure.

INDUSTRIAL APPLICABILITY

By the present disclosure, the problem of time delay caused by multiple interaction triggered by configuration conflicts caused by inter-node coordination in a distributed scheduling manner is solved, and the problem of time delay, caused by backhaul, of a non-coordination user in a centralized scheduling manner is solved; and coordination configuration is performed on parameters which are relatively semi-static or change more slowly to eliminate influence on user scheduling flexibility under the condition of implementing system transmission.

What is claimed is:

1. A scheduling configuration method, comprising:
   configuring, by a centralized controller, coordination parameters of different nodes, and scheduling, by distributed schedulers in each node, user resources of local nodes, wherein the step of configuring, by the centralized controller, the coordination parameters of the different nodes comprises:
   performing, by the centralized controller, at least one of the following configuration on the coordination parameters of the different nodes: Demodulation Reference Signal (DMRS) port or semi-static initialization parameter configuration;
   when receiving coordination request messages of DMRS port and/or initialization parameter coordination configuration triggered by the nodes and determining that it is necessary to respond to the coordination request messages, performing, by the centralized controller, coordination configuration on the DMRS port and/or initialization parameters of the nodes, and sending the DMRS port and/or initialization parameter configuration information of the nodes to each node so that the nodes perform configuration on the basis of the configured DMRS port and/or initialization parameter configuration information.

2. The method according to claim 1, further comprising:
   configuring, by the centralized controller, coordination of BeamForming (BF) modes and/or muting modes of each node, and sending BF mode and/or muting mode configuration information of each node to each node so that each node performs scheduling on the basis of the configured BF mode and/or muting mode configuration information; or
   after receiving coordination request messages of triggering the BF modes and/or the muting modes from the nodes and when determining that it is necessary to respond to the coordination request messages, configuring, by the centralized controller, coordination of the BF modes and/or muting modes of the nodes, and sending the BF mode and/or muting mode configuration information of the nodes to each node so that the nodes perform scheduling on the basis of the configured BF mode and/or muting mode configuration information; or
   selectively sending, by the centralized controller, a CSI request message to one or more nodes, receiving the CSI information sent by the nodes, configuring coordination of the BF modes and/or muting modes of each node according to the CSI of each node, and sending the BF mode and/or muting mode configuration information of each node to each node so that each node performs scheduling on the basis of the configured BF mode and/or muting mode configuration information; or
   when receiving the coordination request messages of triggering the BF modes and/or the muting modes from the nodes and determining that it is necessary to respond, selectively sending, by the centralized controller, the CSI request message to one or more nodes, configuring coordination of the BF modes and/or muting modes of each node according to the CSI of each node after receiving the CSI on each resource set from the nodes, and sending the BF mode and/or muting mode configuration information of each node to each node so that each node performs scheduling on the basis of the configured BF modes and/or muting modes.

3. The method according to claim 1, wherein the DMRS initialization parameters comprise at least one of: scrambling IDs, cell IDs and DMRS port numbers; and
   correspondingly, the step of performing coordination configuration on the DMRS ports and/or initialization parameters of the nodes comprises: performing coordination configuration on DMRS port using and initialization parameters of the nodes on an Almost Blank Subframe (ABS).

4. The method according to claim 1, wherein the nodes comprise: Node Bs, or Radio Remote Heads (RRHs), or Picos, or small cells or Femtos; and
   correspondingly, the centralized controller performs information interaction with the nodes through an X2 interface or an Xn interface, wherein n is a positive integer greater than or equal to 2.

5. The method according to claim 1, further comprising:
   when receiving requests of acquiring the configuration information of the other nodes from the nodes, providing, by the centralized controller, the configuration information of the other nodes for the nodes; or
   performing, by the nodes, interaction about the configuration information,
   wherein the configuration information comprises at least one of the following information: semi-static coordination beam pattern configuration information, muting resource pattern configuration information, resource allocation priority configuration information and DMRS port or semi-static initialization parameter configuration information.

6. A scheduling configuration method, comprising:
   configuring, by a centralized controller, coordination parameters of different nodes, and scheduling, by distributed schedulers in each node, user resources of local nodes, wherein the step of configuring, by the centralized controller, the coordination parameters of the different nodes comprises:
   performing, by the centralized controller, Channel State Information Reference Signal (CSI-RS) configuration and/or Zero Power (ZP) CSI-RS Interference Measurement Resource (IMR) configuration on the coordination parameters of the different nodes;
   wherein the step of configuring, by the centralized controller, the coordination parameters of the different nodes comprises: sending, by the centralized controller, a CSI-RS configuration request message to each node, and receiving CSI-RS configuration information sent by each node; determining, by the centralized controller, ZP CSI-RS configuration information, IMR configuration information and/or CSI-RS configuration information of each node according to the CSI-RS configuration information of each node, and sending the determined ZP CSI-RS configuration information, IMR configuration information and/or CSI-RS configuration information of each node to each node; or determining, by the centralized controller, the ZP CSI-RS configuration information, IMR configuration information and/or CSI-RS configuration information of each node, and sending the determined ZP CSI-RS configuration information, IMR configuration information and/or CSI-RS configuration information of each node to each node; or after receiving CSI-RS, ZP CSI-RS and IMR configuration request messages sent by the nodes, determining, by the centralized controller, the ZP CSI-RS configuration information, IMR configuration information and/or CSI-RS configuration information of the nodes, and sending the determined ZP CSI-RS configuration information, IMR configuration information and/or CSI-RS configuration information of the nodes to the nodes; or after receiving CSI-RS, ZP CSI-RS and IMR configuration request messages sent by one or some nodes, determining, the centralized controller, ZP CSI-RS configuration information, IMR configuration information and/or CSI-RS configuration information of part or all of nodes to which the centralized controller belongs, and sending the reconfigured ZP CSI-RS information, IMR configuration information and/or CSI-RS configuration information to the corresponding part or all of the nodes.

7. The method according to claim 6, wherein the step of determining the CSI-RS configuration information comprises:

when it is determined that there exist conflicts of the CSI-RSs of the nodes, regulating the CSI-RS configuration information to generate the CSI-RS configuration information; or, according to Coordinated Multi-point Transmission and Reception (COMP) requirements of each node, configuring the CSI-RS configuration information of the other nodes to the current node, and determining the CSI-RS configuration information of the other nodes as the CSI-RS configuration information.

8. The method according to claim 6, wherein the CSI-RS configuration information comprises CSI-RS port number information, CSI-RS resource configuration information, CSI-RS subframe configuration information and scrambling Identifier (ID) configuration information; and the ZP CSI-RS configuration information comprises ZP CSI-RS resource configuration information and ZP CSI-RS subframe configuration information.

9. The method according to claim 6, further comprising:

when receiving requests of acquiring the configuration information of the other nodes from the nodes, providing, by the centralized controller, the configuration information of the other nodes for the nodes; or performing, by the nodes, interaction about the configuration information, wherein the configuration information comprises the CSI-RS configuration information, the ZP CSI-RS configuration information, the IMR configuration information.

10. The method according to claim 6, further comprising:

statically or semi-statically configuring, by the centralized controller, the coordination parameters, or, generating the coordination parameters on the basis of CSI and/or CSI-RSs and/or resource mapping configuration parameter related information periodically or non-periodically reported by each node, and semi-statically sending the coordination parameters to each node; or, actively requesting, by the centralized controller, each node to report the CSI and/or the CSI-RSs and/or the resource mapping configuration parameter related information, generating the coordination parameters according to reported parameters, and semi-statically sending the coordination parameters to each node.

11. A scheduling configuration device, comprising: a configurator and schedulers, wherein the configurator is arranged in a centralized controller and configured to configure coordination parameters of different nodes; and the schedulers are arranged in each node and configured to schedule user resources of local nodes, wherein the configurator is further configured to perform Channel State Information Reference Signal (CSI-RS) configuration and/or Zero Power (ZP) CSI-RS Interference Measurement Resource (IMR) configuration on the coordination parameters of different nodes;

wherein the configurator is further configured to send a CSI-RS configuration request message to each node, and receive CSI-RS configuration information of each node from each node;

determine ZP CSI-RS configuration information, IMR configuration information and/or CSI-RS configuration information of each node according to the CSI-RS configuration information of each node, and send the determined ZP CSI-RS configuration information, IMR configuration information and/or CSI-RS configuration information of each node to each node; or determine the ZP CSI-RS configuration information, IMR configuration information and/or CSI-RS configuration information of each node, and send the determined ZP CSI-RS configuration information, IMR configuration information and/or CSI-RS configuration information of each node to each node; or after receiving CSI-RS, ZP CSI-RS and IMR configuration request messages sent by the nodes, determine the ZP CSI-RS configuration information, IMR configuration information and/or CSI-RS configuration information of the nodes, and send the determined ZP CSI-RS configuration information, IMR configuration information and/or CSI-RS configuration information of the nodes to the nodes; or after receiving CSI-RS, ZP CSI-RS and IMR configuration request messages sent by one or some nodes, determine ZP CSI-RS configuration information, IMR configuration information and/or CSI-RS configuration information of part or all of nodes to which the centralized controller belongs, and send the reconfigured ZP CSI-RS configuration information, IMR configuration information and/or CSI-RS configuration information to the corresponding part or all of the nodes.

12. The method according to claim 6, wherein the nodes comprise: Node Bs, or Radio Remote Heads (RRHs), or Picos, or small cells or Femtos; and correspondingly, the centralized controller performs information interaction with the nodes through an X2 interface or an Xn interface, wherein n is a positive integer greater than or equal to 2.

13. The method according to claim 6, further comprising:

configuring, by the centralized controller, coordination of BeamForming (BF) modes and/or muting modes of each node, and sending BF mode and/or muting mode configuration information of each node to each node so that each node performs scheduling on the basis of the configured BF mode and/or muting mode configuration information; or after receiving coordination request messages of triggering the BF modes and/or the muting modes from the nodes and when determining that it is necessary to respond to the coordination request messages, configuring, by the centralized controller, coordination of the BF modes and/or muting modes of the nodes, and sending the BF mode and/or muting mode configuration information of the nodes to each node so that the nodes perform scheduling on the basis of the configured BF mode and/or muting mode configuration information; or selectively sending, by the centralized controller, a CSI request message to one or more nodes, receiving the CSI information sent by the nodes, configuring coordination of the BF modes and/or muting modes of each node according to the CSI of each node, and sending the BF mode and/or muting mode configuration information of each node to each node so that each node performs scheduling on the basis of the configured BF mode and/or muting mode configuration information; or when receiving the coordination request messages of triggering the BF modes and/or the muting modes from the nodes and determining that it is necessary to respond, selectively sending, by the centralized controller, the CSI request message to one or more nodes, configuring coordination of the BF modes and/or muting modes of each node according to the CSI of each node after receiving the CSI on each resource set from the nodes, and sending the BF mode and/or muting mode configuration information of each node to each node so that each node performs scheduling on the basis of the configured BF modes and/or muting modes.

14. The method according to claim 6, further comprising:

when receiving requests of acquiring the configuration information of the other nodes from the nodes, providing, by the centralized controller, the configuration information of the other nodes for the nodes; or performing, by the nodes, interaction about the configuration information, wherein the configuration information comprises at least one of the following information: semi-static coordination beam pattern configuration information, muting resource pattern configuration information, resource allocation priority configuration information and DMRS port or semi-static initialization parameter configuration information.

15. A scheduling configuration device, comprising: a configurator and schedulers, wherein the configurator is arranged in a centralized controller and configured to configure coordination parameters of different nodes; and the schedulers are arranged in each node and configured to schedule user resources of local nodes, wherein the configurator is further configured to perform at least one of the following configuration on the coordination parameters of the different nodes: Demodulation Reference Signal (DMRS) port or semi-static initialization parameter configuration;

wherein the configurator is further configured to: when receiving coordination request messages of DMRS port and/or initialization parameter coordination configuration triggered by the nodes and determining that it is necessary to respond to the coordination request messages, perform coordination configuration on the DMRS port and/or initialization parameters of the nodes, and send the DMRS port and/or initialization parameter configuration information of the nodes to the nodes so that the nodes perform configuration on the basis of the configured DMRS port and/or initialization parameter configuration information.

16. The device according to claim 15, wherein the configurator is further configured to:

configure coordination of BeamForming (BF) modes and/or muting modes of each node, and send BF mode and/or muting mode configuration information of each node to each node so that each node performs scheduling on the basis of the configured BF mode and/or muting mode configuration information; or after receiving coordination request messages of triggering the BF modes and/or the muting modes from the nodes and when determining that it is necessary to respond to the coordination request messages, configure coordination of the BF modes and/or muting modes of the nodes, and send the BF mode and/or muting mode configuration information of the nodes to each node so that the nodes perform scheduling on the basis of the configured BF mode and/or muting mode configuration information; or selectively send a CSI request message to one or more nodes, receive the CSI sent by the nodes, configure coordination of the BF modes and/or muting modes of each node according to the CSI of each node, and send the BF mode and/or muting mode configuration information of each node to each node so that each node performs scheduling on the basis of the configured BF mode and/or muting mode configuration information; or when receiving the coordination request messages of triggering the BF modes and/or the muting modes from the nodes and determining that it is necessary to respond, selectively send the CSI request message to one or more nodes, configure coordination of the BF modes and/or muting modes of each node according to the CSI of each node after receiving the CSI on each resource set from the nodes, and send the BF mode and/or muting mode configuration information of each node to each node so that each node performs scheduling on the basis of the configured BF modes and/or muting modes.

17. The device according to claim 15, wherein the nodes comprise: Node Bs, or Radio Remote Heads (RRHs), or Picos, or small cells or Femtos; and correspondingly, the centralized controller performs information interaction with the nodes through an X2 interface or an Xn interface, wherein n is a positive integer greater than or equal to 2.

18. The device according to claim 11, wherein the configurator is further configured to:

statically or semi-statically configure the coordination parameters, or, generate the coordination parameters on the basis of CSI and/or CSI-RSs and/or resource mapping configuration parameter related information periodically or non-periodically reported by each node, and semi-statically send the coordination parameters to each node; or, by the centralized controller, actively request each node to report the CSI and/or the CSI-RSs and/or the resource mapping configuration parameter related information, generate the coordination parameters according to reported parameters, and semi-statically send the coordination parameters to each node.

19. The device according to claim 11, wherein the configurator is further configured to, when it is determined that there exist conflicts of the CSI-RSs of the nodes, regulate the CSI-RS configuration information to generate the CSI-RS configuration information; or, according to Coordinated Multipoint Transmission and Reception (COMP) requirements of each node, configure the CSI-RS configuration information of the other nodes to the current node, and determine the CSI-RS configuration information of the other nodes as the CSI-RS configuration information.

20. The device according to claim 11, wherein the configurator is further configured to:

configure coordination of BeamForming (BF) modes and/or muting modes of each node, and send BF mode and/or muting mode configuration information of each node to each node so that each node performs scheduling on the basis of the configured BF mode and/or muting mode configuration information; or after receiving coordination request messages of triggering the BF modes and/or the muting modes from the nodes and when determining that it is necessary to respond to the coordination request messages, configure coordination of the BF modes and/or muting modes of the nodes, and send the BF mode and/or muting mode configuration information of the nodes to each node so that the nodes perform scheduling on the basis of the configured BF mode and/or muting mode configuration information; or selectively send a CSI request message to one or more nodes, receive the CSI sent by the nodes, configure coordination of the BF modes and/or muting modes of each node according to the CSI of each node, and send the BF mode and/or muting mode configuration information of each node to each node so that each node performs scheduling on the basis of the configured BF mode and/or muting mode configuration information; or when receiving the coordination request messages of triggering the BF modes and/or the muting modes from the nodes and determining that it is necessary to respond, selectively send the CSI request message to one or more nodes, configure coordination of the BF modes and/or muting modes of each node according to the CSI of each node after receiving the CSI on each resource set from the nodes, and send the BF mode and/or muting mode configuration information of each node to each node so that each node performs scheduling on the basis of the configured BF modes and/or muting modes.

21. The device according to claim 11, wherein the nodes comprise: Node Bs, or Radio Remote Heads (RRHs), or Picos, or small cells or Femtos; and correspondingly, the centralized controller performs information interaction with the nodes through an X2 interface or an Xn interface, wherein n is a positive integer greater than or equal to 2.

* * * * *